(12) United States Patent
Schäuble et al.

(10) Patent No.: US 11,496,003 B2
(45) Date of Patent: Nov. 8, 2022

(54) AUTOMATION FIELD DEVICE

(71) Applicant: Endress+Hauser SE+Co. KG, Maulburg (DE)

(72) Inventors: Harald Schäuble, Lörrach (DE); Simon Gerwig, Schopfheim (DE); Tobias Paul, Schopfheim (DE); Patrick Geib, Bad Säckingen (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 417 days.

(21) Appl. No.: 16/621,865

(22) PCT Filed: May 8, 2018

(86) PCT No.: PCT/EP2018/061879
§ 371 (c)(1),
(2) Date: Dec. 12, 2019

(87) PCT Pub. No.: WO2018/228752
PCT Pub. Date: Dec. 20, 2018

(65) Prior Publication Data
US 2020/0393815 A1    Dec. 17, 2020

(30) Foreign Application Priority Data
Jun. 13, 2017    (DE) ...................... 10 2017 112 972.3

(51) Int. Cl.
*H02J 50/40*    (2016.01)
*H02J 50/80*    (2016.01)
(Continued)

(52) U.S. Cl.
CPC .............. *H02J 50/80* (2016.02); *H02J 50/10* (2016.02); *H02J 50/40* (2016.02); *H04B 5/0031* (2013.01); *H04B 5/0037* (2013.01)

(58) Field of Classification Search
CPC . H02J 50/10; H02J 50/40; H02J 50/80; H04B 5/0031; H04B 5/0037
(Continued)

(56) References Cited

U.S. PATENT DOCUMENTS

| | | | |
|---|---|---|---|
| 5,450,076 A  * | 9/1995 | Donig | ................... G06K 7/0008 |
| | | | 323/356 |
| 11,113,956 B1* | 9/2021 | Gunter | ................. G01N 27/121 |

(Continued)

FOREIGN PATENT DOCUMENTS

| | | |
|---|---|---|
| CN | 101702594 A | 5/2010 |
| CN | 102467969 A | 5/2012 |

(Continued)

*Primary Examiner* — William Hernandez
(74) *Attorney, Agent, or Firm* — Mark A. Logan; Endress+Hauser (USA) Holding Inc.

(57) ABSTRACT

A field device for automation, comprising: a housing; arranged within the housing, a field device electronics, to which a maximum power is made available via a two-wire line; a memory element for storing of data, wherein the memory element, for exchange of data and/or for energy supply, is electrically connected with the field device electronics and, at least in the case of storing the data, requires a power, which at least at times is higher than the maximum power available via the two-wire line; a first, NFC antenna, which is adapted wirelessly to receive an auxiliary energy and to provide the auxiliary energy to the field device electronics; a second antenna, which is adapted to communicate the data wirelessly and to exchange such with the field device electronics; wherein the field device electronics is adapted to supply the memory element with the auxiliary energy.

10 Claims, 1 Drawing Sheet

(51) Int. Cl.
*H04B 5/00* (2006.01)
*H02J 50/10* (2016.01)

(58) Field of Classification Search
USPC .......................................... 307/104; 455/41.1
See application file for complete search history.

(56) References Cited

U.S. PATENT DOCUMENTS

| | | | |
|---|---|---|---|
| 2009/0001930 A1 | 1/2009 | Pohjonen | |
| 2012/0290760 A1* | 11/2012 | McCormack | H01Q 5/25 455/41.1 |
| 2012/0303939 A1* | 11/2012 | Cain | G06F 1/1698 713/1 |
| 2015/0326070 A1 | 11/2015 | Petras et al. | |
| 2015/0333377 A1 | 11/2015 | Davila et al. | |
| 2017/0156022 A1 | 6/2017 | Keller et al. | |
| 2018/0342888 A1* | 11/2018 | Miraglia | H02J 50/10 |

FOREIGN PATENT DOCUMENTS

| | | |
|---|---|---|
| CN | 104252163 A | 12/2014 |
| DE | 102004029024 A1 | 2/2005 |
| DE | 102010040865 A1 | 3/2012 |
| DE | 102011082002 A1 | 3/2013 |
| DE | 102014117905 A1 | 6/2016 |
| DE | 102015115275 A1 | 3/2017 |
| WO | 2014095256 A1 | 6/2014 |

\* cited by examiner

AUTOMATION FIELD DEVICE

CROSS-REFERENCE TO RELATED APPLICATIONS

The present application is related to and claims the priority benefit of German Patent Application No. 10 2017 112 972.3, filed on Jun. 13, 2017 and International Patent Application No. PCT/EP2018/061879, filed on May 8, 2018, the entire contents of which are incorporated herein by reference.

TECHNICAL FIELD

The invention relates to an automation field device as well as to a method for servicing such an automation field device.

BACKGROUND

In process automation technology as well as in manufacturing automation technology, field devices serve for registering and/or influencing process variables. Serving for registering process variables are measuring devices utilizing sensors, such as, for example, fill level measuring devices, flow measuring devices, pressure- and temperature measuring devices, pH-redox potential measuring devices, conductivity measuring devices, etc., which register the corresponding process variables, fill level, flow, pressure, temperature, pH value, and conductivity. Serving for influencing process variables are actuators, such as, for example, valves or pumps, via which the flow of a liquid in a pipe, tube or pipeline section, or the fill level in a container, can be changed.

A large number of such field devices are manufactured and sold by the Endress+Hauser group of companies.

Moreover, it is known to build the field devices in so-called two-conductor technology (in given cases, even four-conductor technology) and to connect them with one another, such that energy supply and communication of the process variable can occur via a single pair of lines (two-wire line). For this, the field devices have, in general, an analog electrical current- or voltage output, for example, a 4 to 20 mA current output.

Likewise known is that the way a field device works is determined with the help of parameters, which are written into modules provided for such purpose, or into specific memory locations of the field device. Storing suitable parameter values in the particular modules, or memory locations, determines the way the field device works. Increasingly applied for this are mobile servicing devices, such as, for example, smartphones, tablets, etc. This procedure is referred to as "parametering". The setting of the parameters is performed by the customer, for example. By selecting suitable parameter values, the customer can adapt the field device to its particular application. For example, in the case of a fill level measuring device, which is to measure the fill level of a medium in a tank, such parameters include the height, or even the diameter, of the tank.

In order that a mobile service unit can know, which parameters can be set in the field device, so-called device description files are required. The device description files include the available parameters and value ranges, which can be set in the particular field devices. Before the actual parametering, these device description files must be made available, e.g. stored, in the mobile service unit and installed in a special parametering software.

In order that the necessary device description file be available for the parametering, such can be brought up in advance in the mobile service unit, and, thus, before the actual parametering and apart from the field device to be parametered. Disadvantageous in such solution is that due to the fact that there are a large number of different field devices and device description files, it cannot be guaranteed that the device description file suitable for the field device was actually brought up in advance. In order to avoid this problem, it is likewise known to download the device description file on-site, i.e. in the immediate vicinity of the field device, and before the parametering of the field device by the mobile service unit, from a server via the mobile Internet. For example, the suitable device description file can be found out via the serial number of the field device to be parametered and such can then be downloaded, provided that an Internet connection can be established.

Disadvantageous in such solution is that an existing Internet connection, or mobile Internet, is needed. Such is especially disadvantageous considering that field devices are frequently located in enormous automated plants, which, on the one hand, block the establishing of a wireless Internet connection and, on the other hand, are often located in geographical areas, where no or only very limited mobile Internet is present. Furthermore, it is in the case of this variant disadvantageous that, due to the size of the device description file, downloading takes a considerable amount of time.

SUMMARY

It is, thus, an object of the invention to simplify the servicing, especially the parametering, of an automation field device.

The object is achieved by an automation field device as defined in claim 1 as well as by a method for servicing an automation field device as defined in claim 6. Advantageous further developments of the invention are set forth in the dependent claims.

In the present invention, an automation field device is provided, which comprises:
  a housing;
  arranged within the housing, a field device electronics, to which a maximum power is made available via a two-wire line or a four-wire line;
  a memory element, preferably arranged within the housing, for storing and/or reading of data, wherein the memory element, for exchange of data and/or for energy supply, is electrically connected or connectable with the field device electronics and, at least in the case of storing data, requires a power, which at least at times is higher than the maximum power available via the two-wire line or the four-wire line;
  a first, NFC antenna, which is adapted wirelessly to receive an auxiliary energy and to provide the auxiliary energy to the field device electronics;
  a second antenna, which is adapted to communicate the data wirelessly and to exchange such with the field device electronics;
  wherein the field device electronics is adapted, furthermore, to supply the memory element with the auxiliary energy, at least when data should be received via the second antenna and be stored in the memory element.

According to the invention, the field device is equipped with two antennas, wherein the first antenna is an NFC antenna, which is adapted exclusively for introducing energy into the field device, and the second antenna is adapted to communicate data wirelessly, i.e. to receive and/or transmit. Because of the introduction of the energy as auxiliary energy via the first, NFC antenna into the field device, a memory element can be operated in the field device for storing and/or reading of data, a memory element, which without the introduction of the auxiliary energy could not be supplied sufficiently with energy. This offers especially in the case of two-conductor field devices, in the case of which the internal energy budget is very limited, the advantage that memory elements can be applied, which have a greater energy requirement than the energy that can be made available by the two-wire line. The field device of the invention, is, thus, operated in such a manner that exclusively energy and no data is introduced via the first, NFC antenna, while, in contrast, data are communicated via the second antenna.

An advantageous embodiment of the invention provides that the second antenna and/or the field device electronics is adapted, furthermore, to transmit the data wirelessly according to a Bluetooth standard or a variant based on the Bluetooth standard, for example, Bluetooth 4.0 or higher.

An advantageous embodiment of the invention provides that the memory element can be plugged into a plug located on the housing, so that the memory element is electrically connected with the field device electronics by plugging into the plug.

An advantageous embodiment of the invention provides that the memory element comprises a serial flash memory. Such serial flash memories are usually built using NOR-flash technology, which are contacted via a serial interface, such as, for example, SPI, I2C, so that no more than 8 pins are required.

An advantageous embodiment of the invention provides that the first, NFC antenna is adapted, furthermore, exclusively to receive the auxiliary energy, and especially no data, wirelessly, so that the auxiliary energy is provided to the field device electronics exclusively through the first, NFC antenna.

In the present invention, furthermore, a method is provided for servicing an automation field device (especially an automation field device according to one of the above described embodiments) by a mobile servicing device, wherein the field device is supplied with a maximum power by a two-wire line or a four-wire line, wherein the method includes steps as follows:
 arranging a mobile service device in radio range of a first, NFC antenna of the field device;
 supplying an auxiliary energy via the first, NFC antenna of the field device by a mobile servicing device arranged in radio range of the first, NFC antenna, wherein the auxiliary energy is fed via the first, NFC antenna to a field device electronics for energy supply of a memory element, so that the memory element is supplied with a sufficient power at least for storing and/or reading of data;
 transmitting data between a second antenna of the field device and a mobile servicing device while the auxiliary energy is being fed;
 storing, or reading-out, the data into, or from, the memory element, wherein the memory element is supplied with the auxiliary energy transmitted via the first, NFC antenna for storing, or reading-out, the data.

An advantageous form of embodiment of the invention provides that by transmitting the data between the second antenna and the mobile servicing device at least one firmware or parts thereof are/is written, or stored, in the memory element by the mobile servicing device.

An advantageous form of embodiment of the invention provides that by the transmitting of the data between the second antenna and the mobile servicing device at least one device description file is transmitted from the memory element to the mobile servicing device, so that after the transmission the device description file is available in the mobile service unit and the field device can be serviced by the mobile servicing device with the assistance of the device description file. Especially, this form of embodiment can provide that the field device is parametered by the mobile servicing device and the device description file transmitted to the mobile servicing device is used for the parametering.

BRIEF DESCRIPTION OF THE DRAWINGS

The invention will now be explained in greater detail based on the appended drawing, the figures of which show as follows.

DETAILED DESCRIPTION

Figure 1:
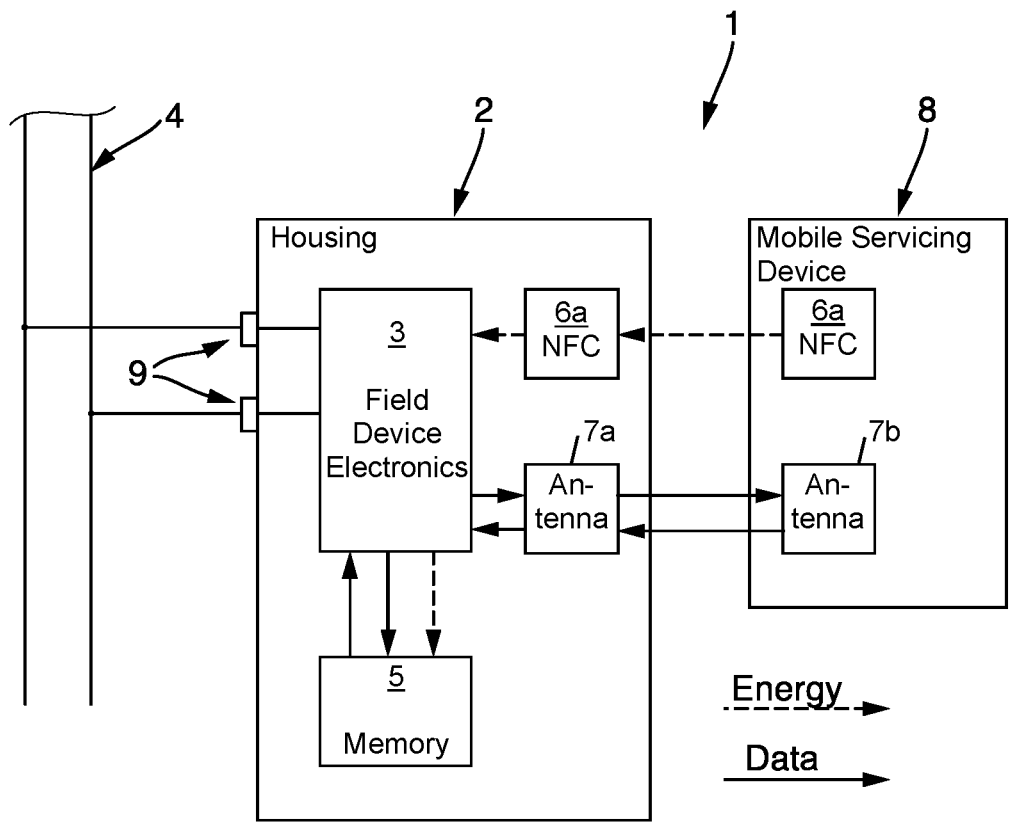
FIG. 1 shows a schematic view of the automation field device of the present disclosure.

FIG. 1 shows a schematic view of a two-conductor automation field device 1 of the invention. This includes a field device housing 2 with two connection terminals 9, via which the two-conductor field device 1 is partially supplied with energy from a connected two-conductor supply line 4. The energy transferred via the connection terminals 9, in the following also referred to as the main energy, is received by a field device electronics 3 arranged within the field device housing 2 and distributed within the field device 1 to the appropriate components. The field device electronics 3 serves, among other things, to condition a measured value, so that such can likewise be transmitted via the two-conductor supply line 4, for example, to a superordinated unit. The field device electronics 3 serves, furthermore, to parameter the field device 1, so that it can be adapted to the desired application. For this, parameters and their value ranges can be set with the assistance of the field device electronics 3. Such a parametering takes place especially at first start-up, in which case the field device 1 is adapted in this way for the intended application. Usually, the first start-up is performed by a service technician on-site, i.e. in the immediate vicinity of the field device.

In order that the service technician can communicate with the field device electronics 3, the field device 1 includes an antenna for data transmission 7a. The antenna 7a and the field device electronics 3 can interact and be adapted, for example, in such a manner that data is transmitted wirelessly according to a Bluetooth standard or according to a variant based on the Bluetooth standard, for example, Bluetooth 4.0 or higher.

The transmission of the data occurs, in such case, by means of a mobile service unit 8, for example, a smart phone or tablet. Present in the mobile service unit 8 for data exchange, especially for parametering, is a special software, which is adapted explicitly for the intended field device. The adapting of the software takes place via the above mentioned device description file, which gives the parameters and value ranges available for the field device of interest.

The device description file can be stored, for example, in an internal memory element 5, i.e. in a memory element 5 arranged within the field device housing. The internal memory element 5 can be embodied as a serial flash memory based on NOR-flash technology, and communicate with the field device electronics, for example, via a serial interface, such as SPI, 12C. Alternatively, the memory element can also be embodied as a pluggable memory element, for example, in the form of a USB flash drive or an SD memory card, which is connected via a plug located on the field device housing.

Since the main energy supplied via the two-conductor supply line is not sufficient for energy supply of such memory elements 5, the field device includes an additional antenna. The additional antenna 6a is in the form of a near field communication antenna (NFC antenna) adapted in such a manner that it serves for purely wireless energy transmission. Via the NFC antenna 6a, the field device can, thus, be fed an auxiliary energy, which is provided to the memory element 5 during the read- or write procedure. The transmission of the auxiliary energy occurs, in turn, exactly as the transmission of the data, from the mobile service unit 8. Of course, the mobile service unit 8, thus, also must have two mutually differingly embodied antennas 6b and 7b, one, on the one hand, for transmitting data and one, on the other hand, for exclusive transmission of energy.

Figure 2:
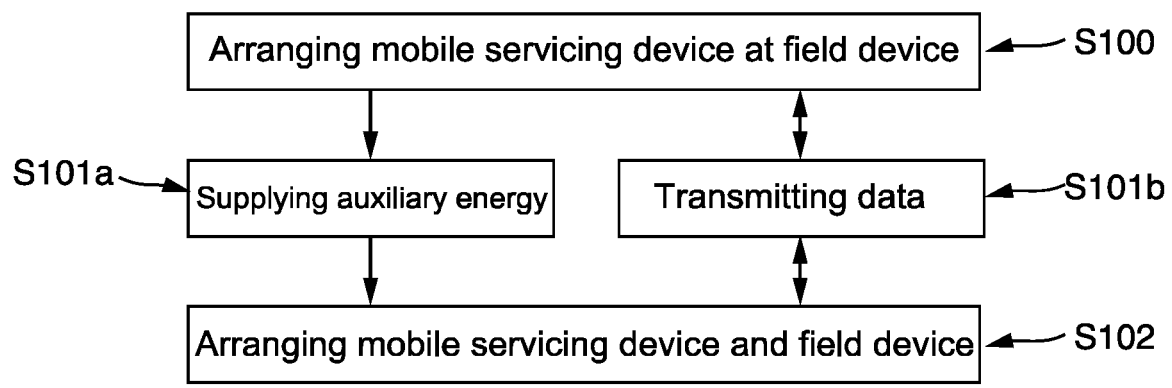
FIG. 2 shows a schematic view of the method of the present disclosure.

With the help of a mobile service unit 8 formed in such a manner, the field device can, thus, be serviced. FIG. 2 shows for this a schematic process flow diagram, which is composed of three steps.

In a first step S100, the mobile servicing device 8 with its NFC antenna 6b must be placed in radio range of the first, NFC antenna 6a of the field device 1. Such can be done, for example, by a service technician on-site.

Then, in a second step S101a, the auxiliary energy is fed by the mobile servicing device 8 via the first, NFC antenna of the field device 6a. The supplied auxiliary energy is distributed within the field device 1 to the memory element 5 by the field device electronics 3, so that the memory element can be operated by the supplied auxiliary energy.

Then, in an additional step S102, data can be read-out from the memory element and/or written into the memory element. In parallel with the energy transmission in step S101a, there takes place in an additional step S101b, which is executed essentially simultaneously, the transmission of the data between the mobile servicing device 8 and the memory element 5 via the antennas for data transmission 7a, 7b.

In this way, for example, a device description file stored in the memory element 5 can be transmitted to the mobile servicing device 8. The transmission occurs, in such case, via the antennas for data transmission 7a, 7b while the memory element 5 is operated constantly with the auxiliary energy. After termination of the transmitting of the device description file to the mobile servicing device 8, the special software can be adapted by the device description file for parametering the field device of interest. Then, using the software adapted for the field device 1, a parametering of the field device 1 can be performed.

LIST OF REFERENCE CHARACTERS

1 automation field device
2 housing
3 field device electronics
4 two-wire line, or four-wire line
5 memory element
6a, 6b first, NFC antennas for energy transmission
7a, 7b second antennas for data transmission
8 mobile servicing device
9 connection terminals

The invention claimed is:

1. A field device for automation, comprising:
a housing;
a field device electronics arranged within the housing, to which a maximum power is made available via a two-wire line or a four-wire line;
a memory element arranged within the housing, for storing of data, wherein the memory element, for exchange of data and/or for energy supply, is electrically connected or connectable with the field device electronics and, at least in the case of storing the data, requires a power, which at least at times is higher than the maximum power available via the two-wire line or the four-wire line;
a first NFC antenna, which is adapted to wirelessly receive an auxiliary energy and to provide the auxiliary energy to the field device electronics; and
a second antenna, which is adapted to communicate data wirelessly and to exchange the data with the field device electronics,
wherein the field device electronics is adapted to supply the memory element with the auxiliary energy, at least when data is received via the second antenna and is stored in the memory element.

2. The field device as claimed in claim 1, wherein the second antenna and the field device electronics is further adapted to transmit the data wirelessly according to a Bluetooth standard or a variant based on the Bluetooth standard.

3. The field device as claimed in claim 1, wherein the memory element can be plugged into a plug located on the housing, so that the memory element is electrically connected with the field device electronics by plugging into the plug.

4. The field device as claimed in claim 1, wherein the memory element includes a serial flash memory.

5. The field device as claimed in claim 1, wherein the first NFC antenna is adapted exclusively to receive the auxiliary energy, and no data, wirelessly, so that the auxiliary energy is transmitted wirelessly exclusively through the first NFC antenna.

6. A method for servicing an automation field device, by a mobile servicing device, wherein the field device is supplied with a maximum power by a two-wire line or a four-wire line, wherein the method comprises steps as follows:
arranging a mobile service device in radio range of a first NFC antenna of the field device;
supplying an auxiliary energy via the first NFC antenna of the field device by the mobile servicing device arranged in radio range of the first NFC antenna, wherein the auxiliary energy is fed via the first NFC antenna to a field device electronics for energy supply of a memory element, so that the memory element is supplied with a sufficient power at least for storing and/or reading of data;
transmitting data between a second antenna of the field device and the mobile servicing device while the auxiliary energy is being supplied;
storing, or reading-out, the data into, or from, the memory element, wherein the memory element is supplied with the auxiliary energy transmitted via the first NFC antenna for storing, or reading-out, the data.

7. The method as claimed in claim 6, wherein by transmitting the data between the second antenna and the mobile servicing device at least one firmware or parts thereof are/is written, or stored in the memory element by the mobile servicing device.

8. The method as claimed in claim 6, wherein between the second antenna and the mobile servicing device at least one device description file is transmitted from the memory element to the mobile servicing device, so that after the transmission the device description file is available in the mobile service unit and the field device can be serviced by the mobile servicing device with the assistance of the device description file.

9. The method as claimed in claim 8, wherein the field device is parametered by the mobile servicing device and the device description file transmitted to the mobile servicing device is used for the parametering.

10. The method as claimed in claim 6, wherein the supplying of the auxiliary energy via the first, NFC antenna and the transmitting of data via the second antenna are performed parallel in time.

\* \* \* \* \*